US011067676B2

(12) United States Patent
Yang et al.

(10) Patent No.: US 11,067,676 B2
(45) Date of Patent: Jul. 20, 2021

(54) LIDAR INTENSITY CALIBRATION

(71) Applicant: UATC, LLC, San Francisco, CA (US)

(72) Inventors: Gehua Yang, Wexford, PA (US); Michael K. Sergi-Curfman, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 332 days.

(21) Appl. No.: 16/100,690

(22) Filed: Aug. 10, 2018

(65) Prior Publication Data

US 2019/0212422 A1    Jul. 11, 2019

Related U.S. Application Data

(60) Provisional application No. 62/614,904, filed on Jan. 8, 2018.

(51) Int. Cl.
*G01S 7/497* (2006.01)
*G01S 17/89* (2020.01)
(Continued)

(52) U.S. Cl.
CPC ............ *G01S 7/497* (2013.01); *G01S 7/4868* (2013.01); *G01S 17/89* (2013.01); *G01S 17/931* (2020.01);
(Continued)

(58) Field of Classification Search
CPC ...... G01S 7/497; G01S 17/931; G01S 7/4868; G01S 17/89; G05D 1/0212; G05D 1/0231; G05D 2201/0213
See application file for complete search history.

(56) References Cited

U.S. PATENT DOCUMENTS

2009/0153586 A1*  6/2009  Yang ..................... G06T 3/4038
                                                                  345/629
2014/0152971 A1*  6/2014  James ...................... G01S 17/42
                                                                   356/4.01
(Continued)

FOREIGN PATENT DOCUMENTS

EP          2728376          5/2014
WO        2019135869        7/2019

OTHER PUBLICATIONS

"International Application Serial No. PCT US2018 065186, International Search Report dated Mar. 21, 2019", 5 pgs.
(Continued)

*Primary Examiner* — Peter D Nolan
*Assistant Examiner* — Wae L Louie
(74) *Attorney, Agent, or Firm* — Dority & Manning, P.A.

(57) ABSTRACT

Aspects of the present disclosure involve a vehicle computer system comprising a computer-readable storage medium storing a set of instructions, and a method for light detection and ranging (Lidar) intensity calibration. The method includes collecting a data set comprising a plurality of raw intensity values output by a channel of a Lidar unit at a particular power level from among multiple power levels at which the channel is capable of operating. The method further includes using a linear model to compute a calibration multiplier and a bias value for the particular power level of the channel. During operation of the vehicle, calibrated intensity values are determined by applying the linear model to subsequent raw intensity values output by the channel at the particular power using the determined calibration multiplier and bias value.

20 Claims, 9 Drawing Sheets

(51) Int. Cl.
*G01S 17/931* (2020.01)
*G01S 7/486* (2020.01)
*G05D 1/02* (2020.01)

(52) U.S. Cl.
CPC ......... *G05D 1/0212* (2013.01); *G05D 1/0231* (2013.01); *G05D 2201/0213* (2013.01)

(56) References Cited

U.S. PATENT DOCUMENTS

| | | | |
|---|---|---|---|
| 2017/0057520 A1* | 3/2017 | Letwin | G05D 1/0061 |
| 2017/0343653 A1* | 11/2017 | Weinberg | G01S 7/4863 |
| 2017/0371348 A1* | 12/2017 | Mou | G01S 17/86 |
| 2018/0348374 A1* | 12/2018 | Laddha | G01S 7/4808 |
| 2019/0056483 A1* | 2/2019 | Bradley | G01S 7/4972 |
| 2019/0056484 A1* | 2/2019 | Bradley | G01S 17/42 |
| 2019/0212422 A1* | 7/2019 | Yang | G01S 7/497 |

OTHER PUBLICATIONS

"International Application Serial No. PCT US2018 065186, Written Opinion dated Mar. 21, 2019", 8 pgs.

* cited by examiner

LIDAR INTENSITY CALIBRATION

CLAIM FOR PRIORITY

This application claims the benefit of priority to U.S. application Ser. No. 62/614,904, filed Jan. 8, 2018, which is hereby incorporated by reference in its entirety.

TECHNICAL FIELD

The subject matter disclosed herein relates to light detection and ranging (Lidar) units. In particular, example embodiments may relate to systems and methods for calibrating Lidar intensity values.

BACKGROUND

Lidar is a radar-like system that uses lasers to create three-dimensional representations of surrounding environments. A Lidar unit includes at least one laser emitter paired with a detector to form a channel, though an array of channels may be used to expand the field of view of the Lidar unit. During operation, each channel emits a laser signal into the environment that is reflected off of the surrounding environment back to the detector. A single channel provides a single point of ranging information. Collectively, channels are combined to create a point cloud that corresponds to a three-dimensional representation of the surrounding environment. The Lidar unit also includes circuitry to measure the time of flight—i.e., the elapsed time from emitting the laser signal to detecting the return signal. The time of flight is used to determine the distance of the Lidar unit to the detected object. Some Lidar units also measure the intensity of the return signal. The intensity of the return signal provides information about the surface reflecting the signal and can be used for object detection. The intensity of the return signals depends on a number of factors, such as the distance of the Lidar to the detected object, the angle of incidence of the emitted laser signal, temperature of the surrounding environment, a power level of the channel (each channel is capable of operating at multiple power levels), and the reflectivity of the detected object. Other factors such as the alignment of the emitter and detector pairs adds signal noise that may impact the uniformity of intensity values output by each channel.

Increasingly, Lidar is finding applications in autonomous vehicles such as partially or fully autonomous cars. Lidar systems for vehicles typically include an array of lasers ("emitters") and an array of detectors, as discussed above. Autonomous vehicles use Lidar for a number of functions, including localization, perception, prediction, and motion planning. Frequently, the intensity values returned by each Lidar channel are used in the localization, perception, prediction, and motion planning of autonomous vehicles because these signals provide information related to the reflectiveness of detected objects.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
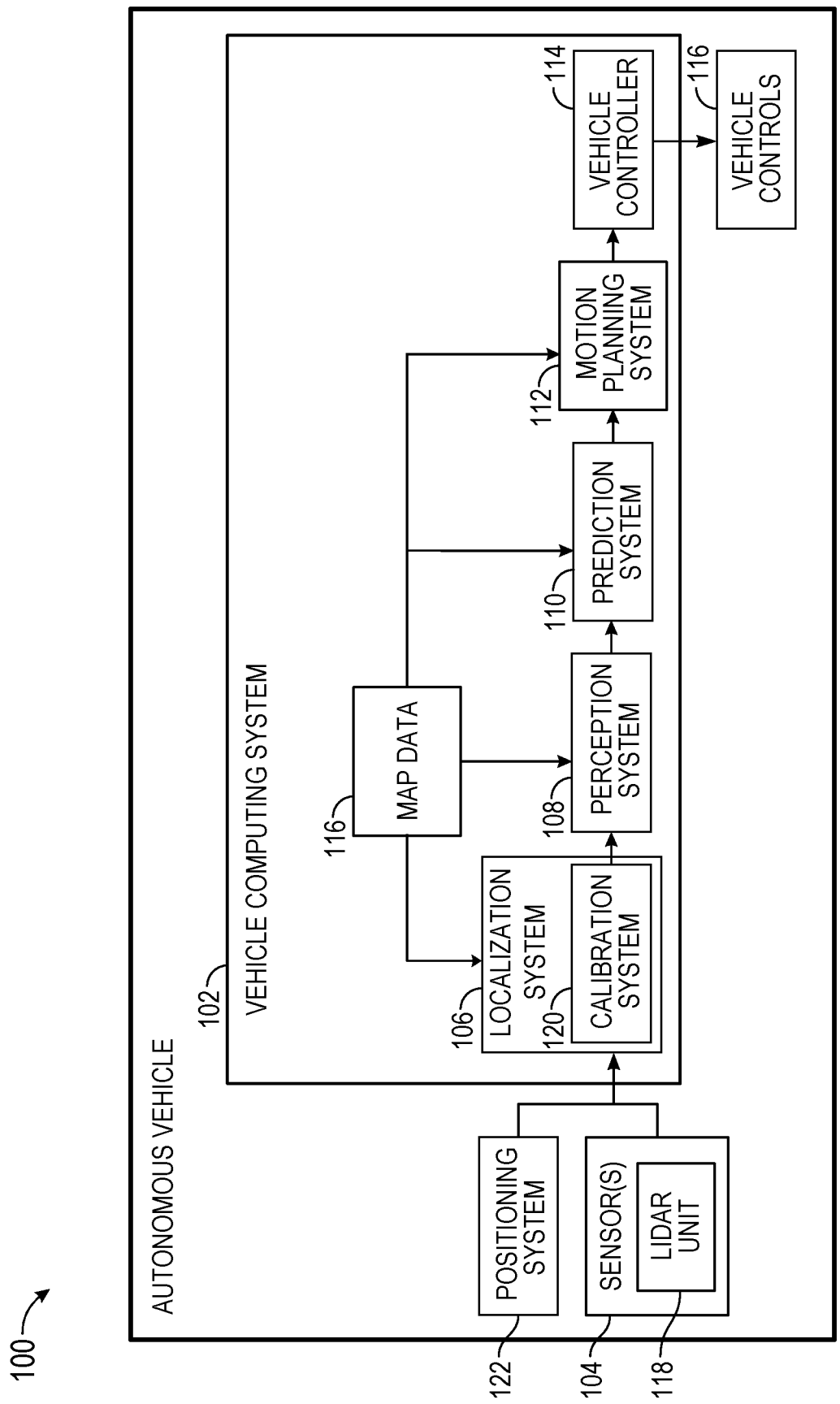
FIG. 1 is a block diagram illustrating an example autonomous vehicle, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Given the lack of uniformity of Lidar intensity values caused by signal noise and the other factors that impact intensity of return signals described above, use of the raw intensity values provided by the Lidar unit often leads to inaccuracies and other problems with localization, perception, prediction, and motion planning for autonomous and semi-autonomous vehicles. To address these issues, among others, aspects of the present disclosure involve systems, methods, and devices for off-line calibration of Lidar intensity values. In accordance with some embodiments, a method includes a data collection stage that involves collecting a data set comprising intensity values output by each channel of the Lidar unit at each power level at which each channel is capable of operating. The collecting of the data set includes obtaining point data output by each channel at each power level, where each data point in the point data has an associated intensity value and corresponds to one of multiple targets that are positioned at various distances from the Lidar unit. Further, in collecting the data set the Lidar unit is positioned at multiple angles relative to each target such that at each power level the point data includes points for each target at multiple different angles.

In some embodiments, the Lidar unit is mounted to a vehicle during the data collection stage and multiple targets are arranged on a track. The vehicle is positioned at various locations along the track, and at each location, the vehicle is oriented at different angles (e.g., using ramps) while obtaining point data for each target at each power level.

In other embodiments, the Lidar unit is detached from the vehicle and mounted on a gimbal that allows the Lidar unit to be rotated at various angles during the data collection stage. In these embodiments, multiple targets are arranged at various distances from the gimbal-mounted Lidar unit and point data is obtained from the Lidar unit for each target and at each power level. Further, the Lidar unit is tilted at multiple angles for each target and each power level.

The method further includes using a linear model to compute a calibration multiplier and bias value for each channel at each power level. The linear model describes an expected intensity value as a function of a raw intensity variable, a calibration multiplier variable, and a bias variable. The computing of the calibration multiplier and bias value for each channel/power level combination includes solving the linear model using a ground truth reflectance value as the expected intensity value while optimizing values for the calibration multiplier variable and bias variable. As an example, the calibration multiplier and bias value may be computed by solving the linear model using an Iterated Re-weighted Least Squares approach.

The calibration multiplier and bias value computed for each channel at each power level is assigned to the corresponding channel/power level combination. In this way, each power level of each channel of the Lidar unit has an independently assigned calibration multiplier and bias value from which calibrated intensity values may be derived. Once assigned, the calibration multiplier and bias value of each channel/power level combination are used at run-time to determine calibrated intensity values from subsequent raw intensity values produced by the corresponding channel at the corresponding power level during operation of an autonomous or semi-autonomous vehicle. More specifically, calibrated intensity values are determined from the linear model by using the value of the calibration multiplier and the bias value for the calibration multiplier variable and bias variable, respectively.

By calibrating raw intensity values in the manner, the method aligns Lidar intensity returns more closely with the reflectivity of reflected surfaces and objects thereby providing downstream run-time processing systems with more accurate and detailed information regarding the reflected surfaces and objects. The downstream processing system may use the more accurate and detailed information to improve autonomous or semi-autonomous vehicle localization, perception, prediction, and motion planning. Further, by independently calibrating each power level of each channel of the Lidar unit, the method accounts for differences in each channel (e.g., alignment of emitters and receivers) at each power level that lead to variances in intensity returns among channels.

With reference to FIG. 1, an example autonomous vehicle 100 is illustrated, according to some embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the autonomous vehicle 100 to facilitate additional functionality that is not specifically described herein.

The autonomous vehicle 100 is capable of sensing its environment and navigating without human input. The autonomous vehicle 100 can be a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous vehicle 100 includes a vehicle computing system 102, one or more sensors 104, and one or more vehicle controls 116. The vehicle computing system 102 can assist in controlling the autonomous vehicle 100. In particular, the vehicle computing system 102 can receive sensor data from the one or more sensors 104, attempt to comprehend the surrounding environment by performing various processing techniques on data collected by the sensors 104, and generate an appropriate motion path through such surrounding environment. The vehicle computing system 102 can control the one or more vehicle controls 116 to operate the autonomous vehicle 100 according to the motion path.

As illustrated in FIG. 1, the vehicle computing system 102 can include one or more computing devices that assist in controlling the autonomous vehicle 100. Vehicle computing system 102 can include a localization system 106, a perception system 108, a prediction system 110, and a motion planning system 112 that cooperate to perceive the dynamic surrounding environment of the autonomous vehicle 100 and determine a trajectory describing a proposed motion path for the autonomous vehicle 100. Vehicle computing system 102 can additionally include a vehicle controller 114 configured to control the one or more vehicle controls 116 (e.g., actuators that control gas flow (propulsion), steering, braking, etc.) to execute the motion of the autonomous vehicle 100 to follow the trajectory.

In particular, in some implementations, any one of the localization system 106, the perception system 108, the prediction system 110, and the motion planning system 112 can obtain sensor data from the one or more sensors 104 that are coupled to or otherwise included within the autonomous vehicle 100. As examples, the one or more sensors 104 can include a Lidar unit 118, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 100.

As one example, for Lidar unit 118, the sensor data can include point data that includes the location (e.g., in three-dimensional space relative to the Lidar unit 118) of a number of points that correspond to objects that have reflected an emitted laser. For example, Lidar unit 118 can measure distances by measuring the Time of Flight (TOF) that it takes a short laser pulse to travel from the sensor(s) 104 to an object and back, calculating the distance from the known speed of light. The point data further includes an intensity value for each point, which, as described above, can provide information about the reflectiveness of the surfaces and objects that have reflected an emitted laser.

As another example, for RADAR systems, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for cameras, various processing techniques (e.g., range imaging techniques such as, for example, structure from motion, structured light, stereo triangulation, and/or other techniques) can be performed to identify the location (e.g., in three-dimensional space relative to a camera) of a number of points that correspond to objects that are depicted in imagery captured by the camera. Other sensor systems can identify the location of points that correspond to objects as well.

As another example, the one or more sensors 104 can include a positioning system 122. The positioning system 122 can determine a current position of the autonomous vehicle 100. The positioning system 122 can be any device or circuitry for analyzing the position of the autonomous vehicle 100. For example, the positioning system 122 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the autonomous vehicle 100 can be used by various systems of the vehicle computing system 102.

Thus, the one or more sensors 104 can be used to collect sensor data that includes information that describes the location (e.g., in three-dimensional space relative to the autonomous vehicle 100) of points that correspond to objects within the surrounding environment of the autonomous vehicle 100.

In addition to the sensor data, the localization system 106, the perception system 108, prediction system 110 and/or motion planning system 112 can retrieve or otherwise obtain map data 116 that provides detailed information about the surrounding environment of the autonomous vehicle 100. The map data 116 can provide information regarding: the identity and location of different travelways (e.g., roadways, alleyways, trails, and other paths designated for travel), road segments, buildings, or other items or objects (e.g., lampposts, crosswalks, curbing, etc.); known reflectiveness of different travelways, road segments, buildings, or other items or objects; the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

In addition, according to an aspect of the present disclosure, the map data 116 can include information that describes a significant number of nominal pathways through the world. As an example, in some instances, nominal pathways can generally correspond to common patterns of vehicle travel along one or more lanes (e.g., lanes on a roadway or other travelway). For example, a nominal pathway through a lane can generally correspond to a center line of such lane.

The localization system 106 receives the map data 122, some or all of the sensor data from the sensors 104, and generates vehicle poses for the AV system 100 based on this information. A vehicle pose describes the position and attitude of the vehicle. The position of the AV system 100 is a point in a three-dimensional space. In some examples, the position is described by values for a set of Cartesian coordinates, although any other suitable coordinate system may be used. The attitude of the AV system 100 generally describes the way in which the AV system 100 is oriented at its position. In some examples, attitude is described by a yaw about the vertical axis, a pitch about a first horizontal axis, and a roll about a second horizontal axis. In some examples, the localization system 106 generates vehicle poses periodically (e.g., every second, every half second, etc.). The localization system 106 appends time stamps to vehicle poses, where the time stamp for a pose indicates the point in time that is described by the pose. The localization system 106 generates vehicle poses by comparing sensor data (e.g., remote sensor data) to map data 122 describing the surrounding environment of the AV system 100.

In some examples, the localization system 106 includes one or more localizations and a pose filter. Localizations generate pose estimates by comparing remote sensor data (e.g., Lidar, RADAR, etc. data) to map data 122. The pose filter receives pose estimates from the one or more localizations as well as other sensor data such as, for example, motion sensor data from an inertial measurement unit (IMU), encoder, odometer, and the like. In some examples, the pose filter executes a Kalman filter or other machine learning algorithm to combine pose estimates from the one or more localizations with motion sensor data to generate vehicle poses.

The localization system 106 may include a calibration system 120 configured to apply one or more calibration terms (e.g., a multiplier and a bias) to the point data output by the Lidar unit 118 to calibrate the intensity value returns prior to downstream processing. As will be described in further detail below, the calibration system 120 calibrates intensity values in a manner that aligns them more closely with the actual reflectivity of the surfaces and objects that have reflected an emitted laser.

The perception system 108 can identify one or more objects that are proximate to the autonomous vehicle 100 based on sensor data received from the one or more sensors 104 and/or the map data 116. In particular, in some implementations, the perception system 108 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 108 can determine state data for each object over a number of iterations. In particular, the perception system 108 can update the state data for each object at each iteration. Thus, the perception system 108 can detect and track objects (e.g., vehicles) that are proximate to the autonomous vehicle 100 over time.

The prediction system 110 can receive the state data from the perception system 108 and predict one or more future locations for each object based on such state data. For example, the prediction system 110 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 112 can determine a motion plan for the autonomous vehicle 100 based at least in part on the predicted one or more future locations for the object provided by the prediction system 110 and/or the state data for the object provided by the perception system 108. Stated differently, given information about the current locations of objects and/or predicted future locations of proximate objects, the motion planning system 112 can determine a motion plan for the autonomous vehicle 100 that best navigates the autonomous vehicle 100 relative to the objects at such locations.

The motion plan can be provided from the motion planning system 112 to a vehicle controller 114. In some implementations, the vehicle controller 114 can be a linear controller that may not have the same level of information about the environment and obstacles around the desired path of movement as is available in other computing system components (e.g., the perception system 108, prediction system 110, motion planning system 112, etc.) Nonetheless, the vehicle controller 114 can function to keep the autonomous vehicle 100 reasonably close to the motion plan.

More particularly, the vehicle controller 114 can be configured to control motion of the autonomous vehicle 100 to follow the motion plan. The vehicle controller 114 can control one or more of propulsion and braking of the autonomous vehicle 100 to follow the motion plan. The vehicle controller 114 can also control steering of the autonomous vehicle 100 to follow the motion plan. In some implementations, the vehicle controller 114 can be configured to generate one or more vehicle actuator commands and to further control one or more vehicle actuators provided within vehicle controls 116 in accordance with the vehicle actuator command(s). Vehicle actuators within vehicle controls 116 can include, for example, a steering actuator, a braking actuator, and/or a propulsion actuator.

Each of the localization system 106, the perception system 108, the prediction system 110, the motion planning system 112, and the vehicle controller 114 can include computer logic utilized to provide desired functionality. In some implementations, each of the localization system 106, the perception system 108, the prediction system 110, the motion planning system 112, and the vehicle controller 114 can be implemented in hardware, firmware, and/or software controlling a general-purpose processor. For example, in some implementations, each of the localization system 106, the perception system 108, the prediction system 110, the motion planning system 112, and the vehicle controller 114 includes program files stored on a storage device, loaded into a memory and executed by one or more processors. In other implementations, each of the localization system 106, the perception system 108, the prediction system 110, the motion planning system 112, and the vehicle controller 114 includes one or more sets of computer-executable instructions that are stored in a tangible computer-readable storage medium such as RAM, hard disk, or optical or magnetic media.

Figure 2:
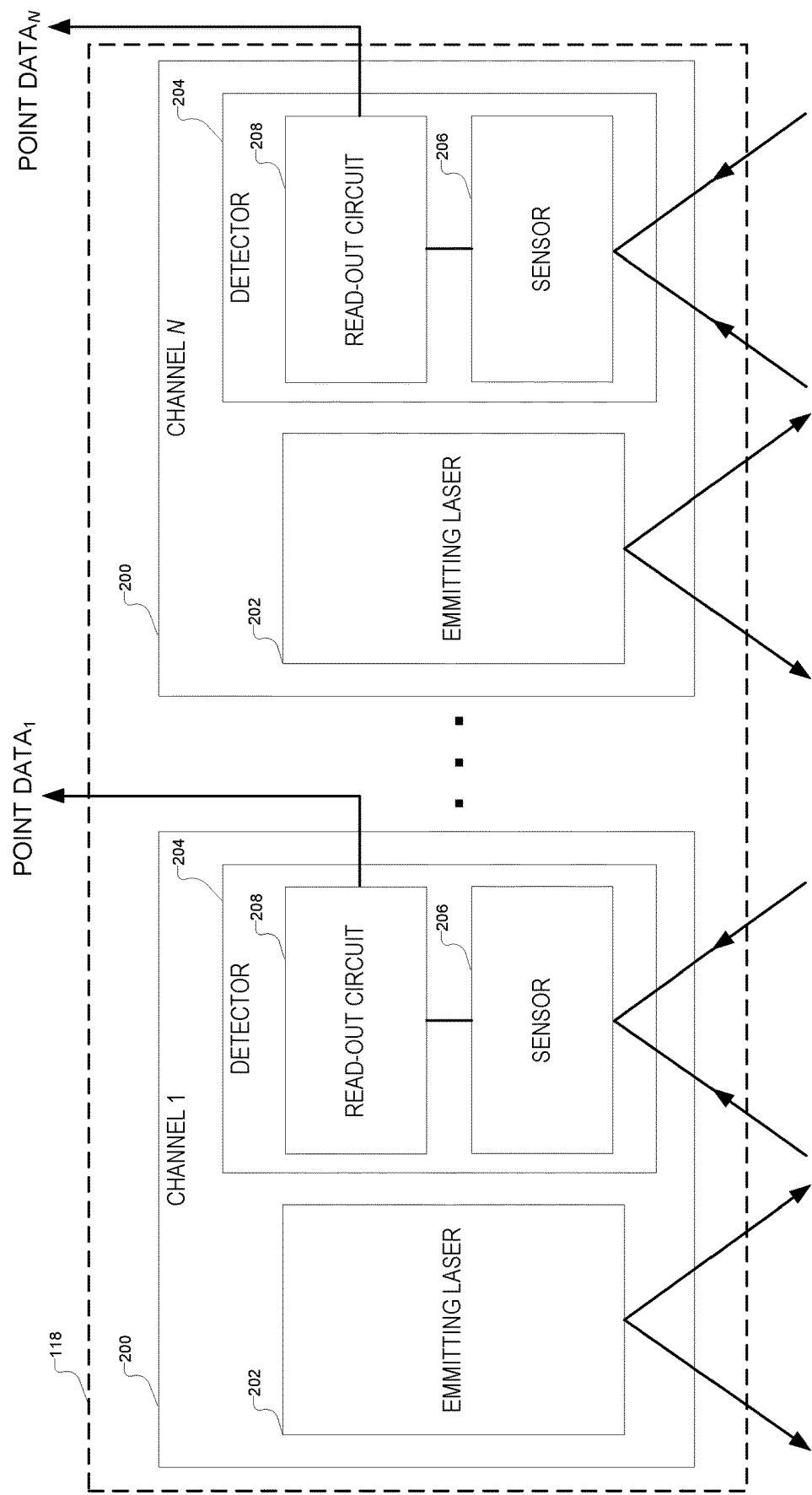
FIG. 2 is block diagram illustrating a Lidar unit, which may be included as part of the autonomous vehicle illustrated in FIG. 1, according to some embodiments.

FIG. 2 is block diagram illustrating the Lidar unit 118, which may be included as part of the autonomous vehicle 100, according to some embodiments. To avoid obscuring the inventive subject matter with unnecessary detail, various functional components that are not germane to conveying an understanding of the inventive subject matter have been omitted from FIG. 2. However, a skilled artisan will readily recognize that various additional functional components may be included as part of the Lidar unit 118 to facilitate additional functionality that is not specifically described herein.

As shown, the Lidar unit 118 comprises multiple channels 200—specifically, channels 1-N are illustrated. Each channel 200 outputs point data that provides a single point of ranging information. Collectively, the point data output by each of the channels 200 (i.e., point data$_{1-N}$) is combined to create a point cloud that corresponds to a three-dimensional representation of the surrounding environment.

Each channel 200 comprises an emitter 202 paired with a detector 204. The emitter 202 emits a laser signal into the environment that is reflected off the surrounding environment and returned back to a sensor 206 (e.g., a photodetector) in the detector 204. Each emitter 202 may have an adjustable power level that controls an intensity of the emitted laser signal. The adjustable power level allows the emitter 202 to be capable of emitting the laser signal at one of multiple different power levels (e.g., intensities).

The sensor 206 provides the return signal to a read-out circuit 208 and the read-out circuit 208, in turn, outputs the point data based on the return signal. The point data comprises a distance of the Lidar unit 118 from a detected surface (e.g., a road) that is determined by the read-out circuit 208 by measuring the time of flight, which is the time elapsed between the emitter 202 emitting the laser signal to the detector 204 detecting the return signal.

The point data further includes an intensity value corresponding to each return signal. The intensity value indicates a measure of intensity of the return signal determined by the read-out circuit 208. As noted above, the intensity of the return signal provides information about the surface reflecting the signal and can be used by any one of the localization system 106, perception system 110, prediction system 112, and motion planning system 114 for localization, perception, prediction, and motion planning. The intensity of the return signals depends on a number of factors, such as the distance of the Lidar unit 118 to the detected surface, the angle of incidence at which the emitter 202 emits the laser signal, temperature of the surrounding environment, the alignment of the emitter 202 and the detector 204, and the reflectivity of the detected surface.

Figure 3:
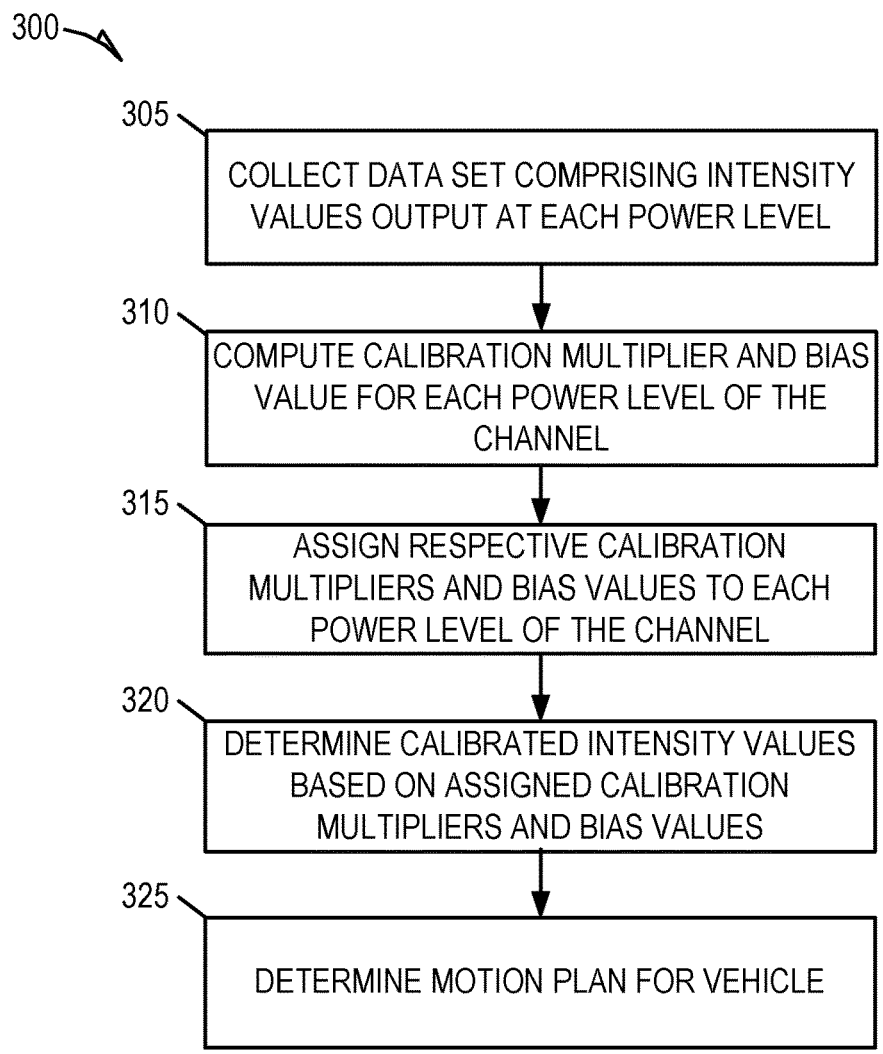
FIG. 3 is a flowchart illustrating example operations performed as part of a method for calibrating Lidar intensity values, according to some embodiments.

FIG. 3 is a flowchart illustrating a method 300 for calibrating Lidar intensity values, according to some embodiments. The method 300 may be embodied in computer-readable instructions for execution by a hardware component (e.g., a processor) such that the operations of the method 300 may be performed by one or more functional components of the vehicle computing system 102. Accordingly, the method 300 is described below, by way of example with reference thereto. However, it shall be appreciated that the method 300 may be deployed on various other hardware configurations and is not intended to be limited to the vehicle computing system 102. For example, in some embodiments, the Lidar unit 118 may include one or more hardware components configured (e.g., by a set of computer-readable instructions) to execute the operations of the method 300.

At operation 305, the calibration system 120 collects a data set comprising point data output by each channel 200 of the Lidar unit 118 at each power level each channel 200 is capable of producing an emitted laser signal. The point data output by each channel 200 includes a set of points, each of which has an associated raw intensity value. Thus, the collected data set includes a plurality of raw intensity values. Each point corresponds to a target from among a set of targets, each of which has a known reflectance value. A known reflectance value may also be referred to as a ground truth reflectance value. For each channel 200, the data set includes point data for each target in the set of targets. The point data for each target includes points output by the corresponding channel 200 at various distances from the target. Further, at each distance, the point data for each target includes points output by the corresponding channel 200 while the Lidar unit 118 is oriented at various angles.

Accordingly, as part of collecting the data set, a plurality of targets with known reflectance may be arranged by an operator (e.g., a human or a machine), and data points may be obtained from each channel 200 at each possible power level while positioning the Lidar unit 118 at multiple distances and angles relative to the targets. Further details regarding these operations are discussed below in reference to FIGS. 4A-4C, 5, and 6.

At operation 310, the calibration system 120 computes a calibration multiplier and a bias value for each power level of each channel 200 using a linear model. The linear model describes an expected intensity value as a function of a raw intensity variable, a calibration multiplier variable, and a bias variable. For example, the linear model may include the following equation:

$$\hat{I}_i = a_{l,p} \cdot I_i^{raw} + b_{l,p}$$

Where $\hat{I}_i$ is the expected intensity value; $a_{l,p}$ is the calibration multiplier variable of a channel, l, at power level, p; $I^i raw$, is a raw intensity variable; and $b_{l,p}$ is the bias variable of a channel, l, at power level, p. In computing the calibration multiplier and bias value for each channel/power level combination, a ground truth reflectance value (e.g., a known reflectance value of a corresponding target) is used as the expected intensity value $\hat{I}_i$, in the linear model while optimizing values for the calibration multiplier variable, a, and bias variable, b.

In some embodiments, the calibration multiplier variable, a, and bias variable, b, for each channel/power level combination are computed by solving the linear model using an Iterated Re-weighted Least Squares approach, which is represented by the following equation:

$$L = \sum_i w_i \left[a \cdot I_i^{raw} + b - \hat{I}_i\right]^2 + \alpha_1(\alpha - 1)^2 + \alpha_2 b^2$$

where α1(a−)2+α2b2 are penalty terms that compensate for noisy input data (i.e., raw intensity values) to ensure that the determined calibration multiplier and bias value are within an expected range (e.g., greater than zero). Further, in the above equation, $w_i$ may be represented by the following objective function:

$$w_i = \frac{\phi(I_i^{raw})\psi(a \cdot I_i^{raw} + b - \hat{I}_i)}{\text{var}(I^{raw})}$$

At operation 315, the calibration system 120 assigns respective calibration multipliers and bias values to each power level of each channel 200 of the Lidar unit 118. That is, the calibration multiplier and bias value determined for a particular power level of a particular channel 200 is assigned to the particular power level of the particular channel 200.

During operation of the autonomous vehicle 100, the calibration system 120, at operation 320, uses the assigned calibration multipliers and bias values to determine calibrated intensity values from raw intensity values output by each channel 200 of the Lidar unit 118. More specifically, for a particular power level of a particular channel 200, a calibrated intensity value may be determined from a raw intensity value by inputting the values for raw intensity, the assigned calibration multiplier, and the assigned bias into the corresponding variables in the linear model.

By independently assigning calibration multipliers and bias values to each channel/power level combination, the calibration system 120 is capable of independently calibrating intensity values output by each channel 200 at each power level during operation of the autonomous vehicle 100. Further, by calibrating these values in the manner, the resulting intensity values are more closely aligned with the reflectivity of reflected surfaces and objects thereby providing downstream processing systems (e.g., the perception system 108, the prediction system 110, the motion planning system 112, and the vehicle controller 114) with more accurate and detailed information regarding the reflected surfaces and objects. These systems may use the more accurate and detailed information to improve autonomous or semi-autonomous vehicle localization, perception, prediction, and motion planning.

During continued operation of the vehicle, the motion planning system 112, at operation 325, determines a motion plan for the vehicle based on the calibrated intensity values determined from the raw intensity values output by each channel 200 of the Lidar unit 118. As noted above, the vehicle controller 114 uses the motion plan to control motion of the vehicle.

Figure 4A:
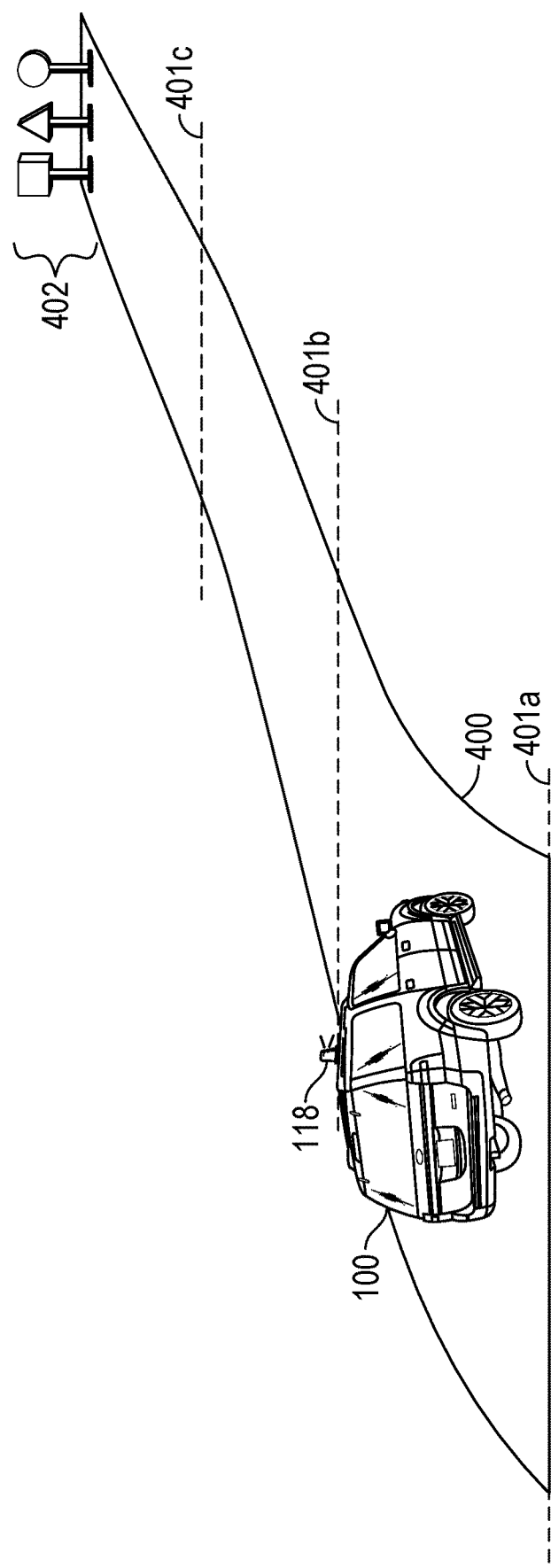
FIGS. 4A-4C are diagrams illustrating an example autonomous vehicle track arranged for collecting data for use in calibrating Lidar intensity values, according to some embodiments.
Figure 4B:
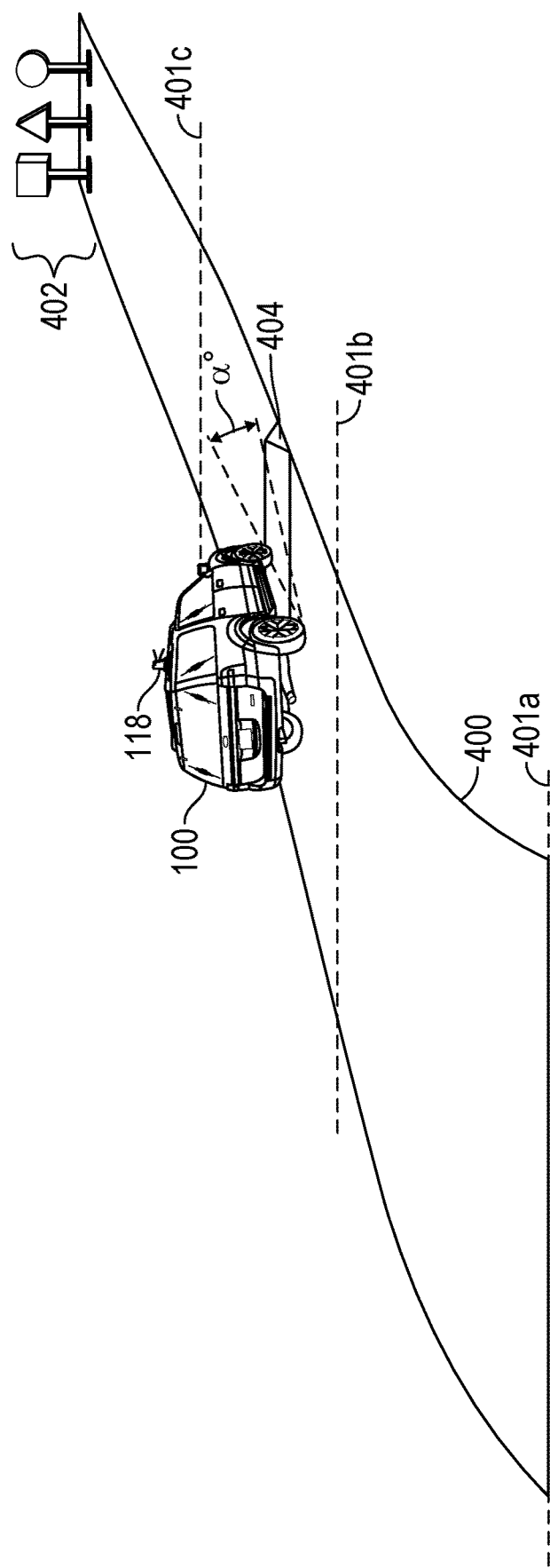
Figure 4C:
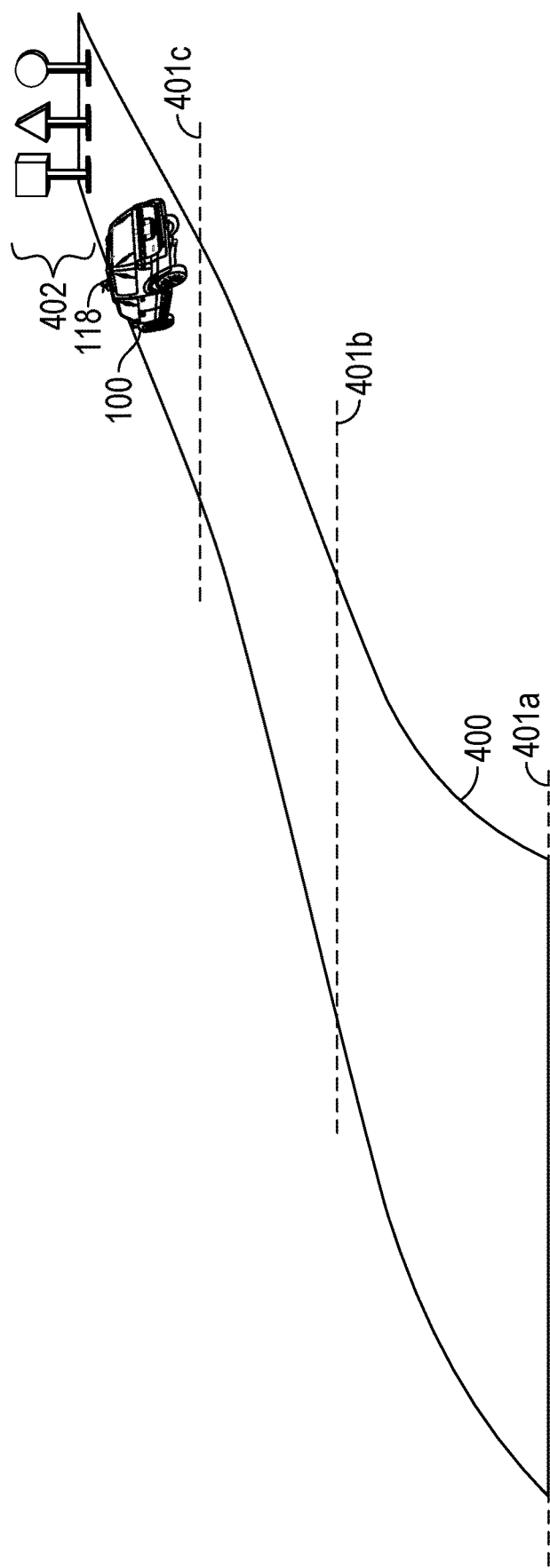

FIGS. 4A-4C are diagrams illustrating an example autonomous vehicle track 400 arranged for collecting data for use in calibrating Lidar intensity values, according to some embodiments. More specifically, FIGS. 4A-4C illustrate a track 400 (e.g., a closed travelway) on which a set of targets 402 are arranged. As shown, the set of targets 402 is placed at one end of the track 400. Each target may have known or observed reflective properties.

While collecting data for use in calibrating the Lidar unit 118, the autonomous vehicle 100 may be positioned at multiple different measurement locations along the track 400 that are at various distance from the set of targets 402. For example, the track 400 may be divided into multiple segments—401a, 401b, and 401c—each of which may provide a measurement location at which the autonomous vehicle 100 may be positioned.

As shown in FIG. 4A, the autonomous vehicle 100 is initially positioned (e.g., by the vehicle computing system 102) within segment 401a, which is the farthest measurement location on the track 400. In FIG. 4B, the autonomous vehicle 100 is positioned at a measurement location within segment 401b, and in FIG. 4C, the autonomous vehicle 100 is positioned at a measurement location within segment 401c. Further, while the autonomous vehicle 100 may be positioned such that it is facing the set of targets 402 at measurement locations that are far away from the set of targets as shown in FIGS. 4A and 4B, the autonomous vehicle 100 may be positioned sideways at more proximate measurement locations as shown in FIG. 4C to avoid obscuring the view of the set of targets 402 by the Lidar unit 118.

At each measurement location, point data output by the Lidar unit 118 is collected by the vehicle computing system 102. At each measurement location, the point data may be collected with the autonomous vehicle 100 oriented at different angles relative to the set of targets 402. For example, each of the segments 401a-c may be of varied gradients that provide various inclines or declines on which the autonomous vehicle 100 may be positioned (e.g., by the vehicle computing system 102) to achieve the different angles of orientation. As another example, any one of the segments 401a-c may include one or more ramps on which the autonomous vehicle 100 may be positioned (e.g., by the vehicle computing system 102) to achieve the different angles of orientation. For example, as shown, in FIG. 4B, a ramp 404 is used to orient the vehicle 100 at an incline of a°.

Figure 5:
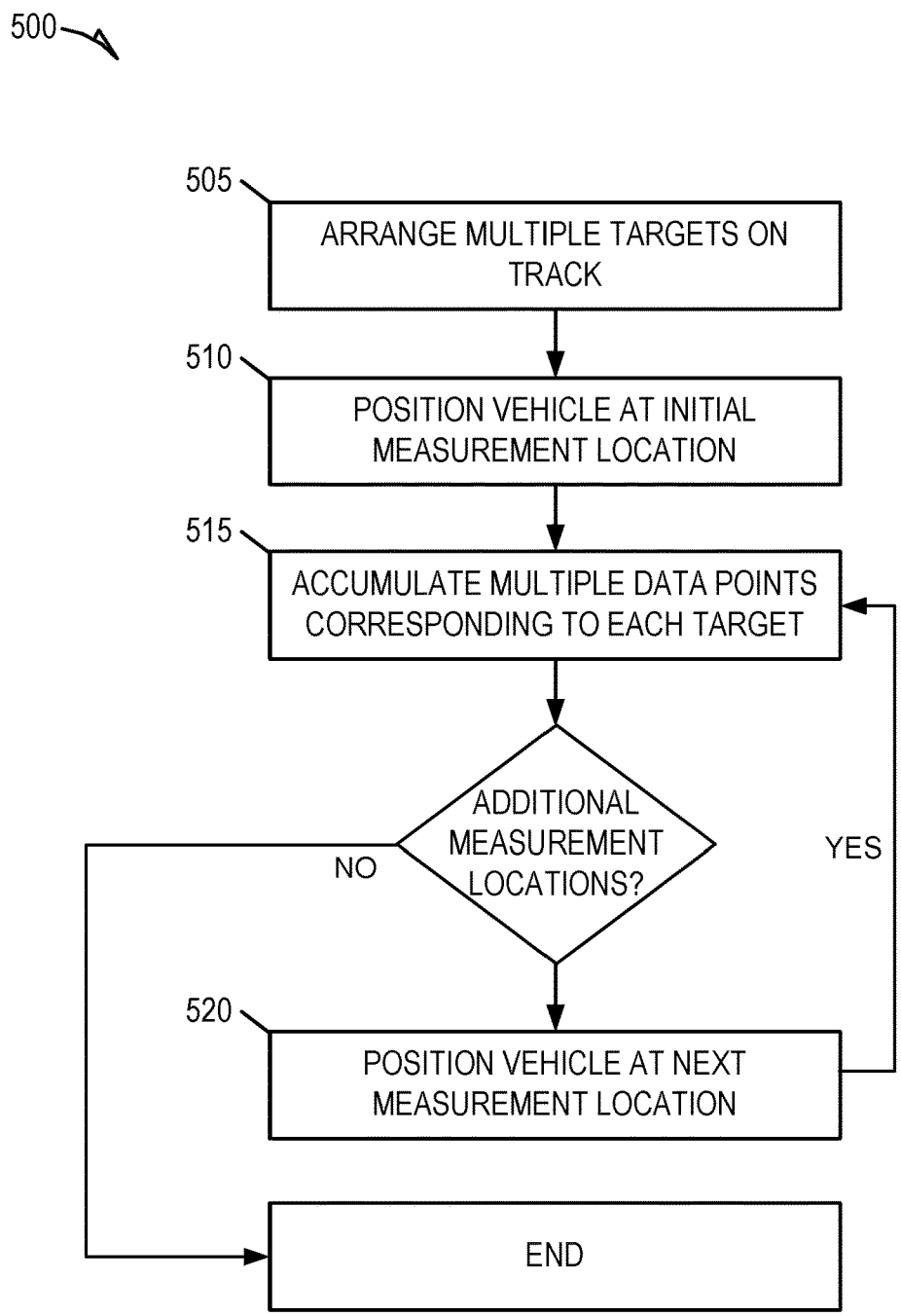
FIG. 5 is a flowchart illustrating example operations performed as part of a method for collecting data for use in calibrating Lidar intensity values, according to some embodiments.

FIG. 5 is a flowchart illustrating example operations performed as part of a method 500 for collecting data for use in calibrating Lidar intensity values, according to some embodiments. Consistent with some embodiments, the method 500 may be performed as part of operation 305 of method 300, during which the vehicle computing system 102 collects a data set comprising intensity values output by each channel 200 of the Lidar unit 118. One or more operations performed as part of the method 500 may be performed by a human operator, a machine operator, or a combination of both. Accordingly, at least some of the operations performed as part of the method 500 may be embodied in computer-readable instructions for execution by a hardware component (e.g., a processor) such as a component of the vehicle computing system 102. Further, in the context of method 500, a track such as the track 400 illustrated in FIGS. 4A-4C may be used, and thus, method 500 is described below with in reference thereto.

At operation 505, an operator (e.g., human or machine) places the set of targets 402 on the track 400. As an example, the set of targets 402 may be placed at one end of the track 400 as shown in FIG. 4A-4C. The set of targets 402 may be arranged in a variety of manners as long as one target is not obscured by another target. For example, the set of targets 402 may be arranged in a line or staggered.

At operation 510, the vehicle computing system 102 positions the autonomous vehicle 100 at an initial measurement location on the track 400 (e.g., within the segment 401a). The vehicle computing system 102 may position the autonomous vehicle 100 at the initial position responsive to a set of instructions provided to the vehicle computing system 102 via input by a passenger of the autonomous vehicle 100 or another remote human operator. The set of instructions may include a list of measurement locations along the track 400.

At operation 515, the calibration system 120 collects multiple data points output by each channel 200 of the Lidar unit 118 corresponding to each target in the set of targets 402. The multiple data points output by each channel 200 include data points output at each power level. The data points output at each power level include data points output while the autonomous vehicle 100 is oriented at each of multiple different angles relative to the set of targets 402. As mentioned above, the multiple different angles may be achieved using one or more ramps or using varied gradients of the track 400.

In collecting the multiple data points corresponding to each target, the calibration system 120 may initially obtain the complete set of point data output each channel 200. The complete set of point data output by each channel includes the multiple data points that correspond to each target as well as data points that correspond to the surrounding environment. The calibration system 120 may identify the data points that specifically correspond to the set of targets based on input provided by a human operator that includes a bounding box that defines a location of the set of targets 402 within the complete set of point data.

Assuming there are additional measurement locations, after collecting the multiple data points at the initial measurement location, the vehicle computing system 102 positions the autonomous vehicle 100 at the next measurement location (operation 520) at which the calibration system 120 again collects multiple data points output by each channel 200 of the Lidar unit 118 corresponding to each target in the set of targets 402 in the manner described above in reference to operation 515. The process is repeated until the vehicle computing system 102 collects multiple data points corresponding to each target at each measurement location.

Figure 6:
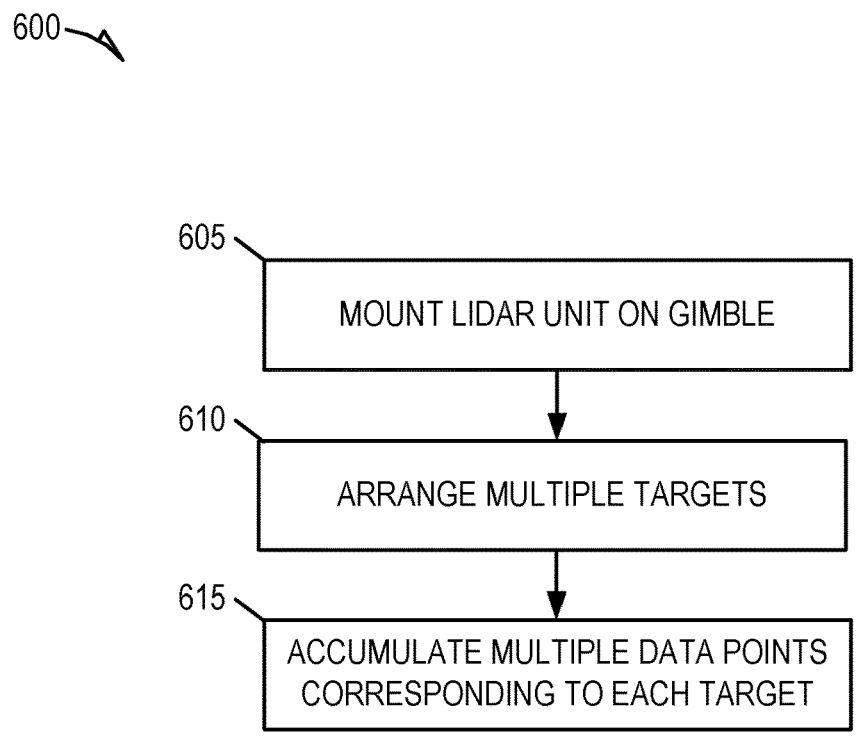
FIG. 6 is a flowchart illustrating example operations performed as part of a method for collecting data for use in calibrating Lidar intensity values, according to some alternative embodiments.

FIG. 6 is a flowchart illustrating example operations performed as part of a method 600 for collecting data for use in calibrating Lidar intensity values, according to some alternative embodiments. Consistent with some embodiments, the method 600 may be performed as part of operation 305 of method 300, during which the vehicle computing system 102 collects a data set comprising intensity values output by each channel 200 of the Lidar unit 118. One or more operations performed as part of the method 600 may be performed by a human operator, a machine operator, or a combination of both. Accordingly, at least some of the operations performed as part of the method 600 may be embodied in computer-readable instructions for execution by a hardware component (e.g., a processor) such as a component of the vehicle computing system 102. Further, in the context of method 600, the Lidar unit 118 is removed from the autonomous vehicle 100.

At operation 605, one or more operators (e.g., humans and/or machines) mounts the Lidar unit 118 on a gimbal. The gimbal allows for rotation of the Lidar unit 118 about a single axis. At operation 610, the one or more operators arrange multiple targets. More specifically, targets are placed at various fixed distances from the gimbal-mounted Lidar unit 118. Each target may have known or observed reflective properties.

At operation 615, the calibration system 120 collects multiple data points output by each channel 200 of the Lidar unit 118 corresponding to each target in the set of targets 402. The multiple data points output by each channel 200 include data points output at each power level. The data points output at each power level include data points output while the Lidar unit 118 is oriented at each of multiple different angles relative to the set of targets 402. Accordingly, while collecting the multiple data points, the gimbal may be used to rotate the Lidar unit 118 about the axis to orient the Lidar unit 118 at different angles relative to the set of targets. Further, while collecting the multiple data points, the gimbal may be used to position the Lidar unit 118 such that it faces each target while collecting the data points corresponding to the target.

Figure 7:
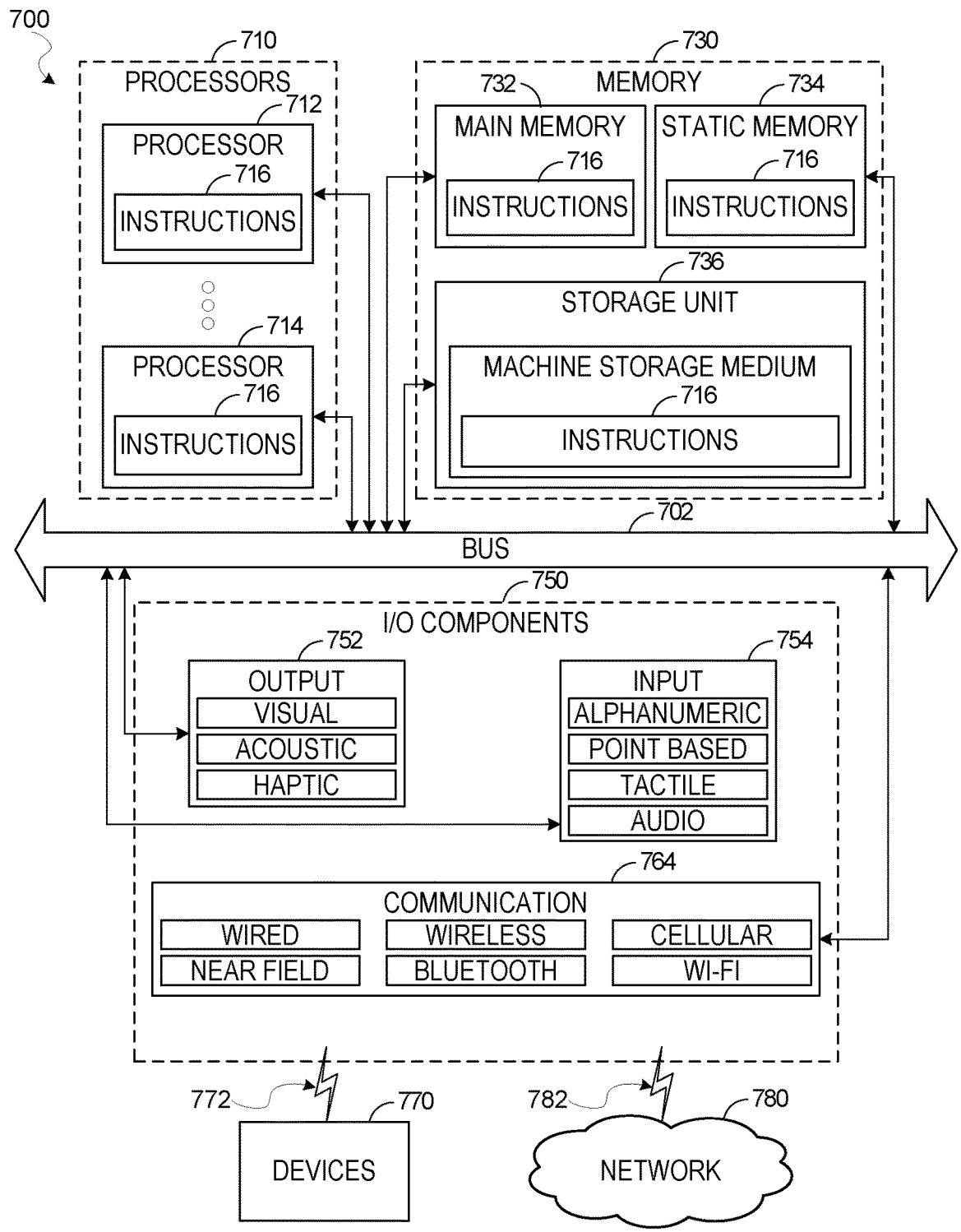
FIG. 7 is a diagrammatic representation of a machine in the example form of a computer system within which a set of instructions for causing the machine to perform any one or more of the methodologies discussed herein may be executed.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the method 300. In this way, the instructions 716 transform a general, non-programmed machine into a particular machine 700, such as the vehicle computing system 102 that is specially configured to carry out the described and illustrated functions in the manner described here. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, both accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)).

Executable Instructions and Machine Storage Medium

The various memories (e.g., 730, 732, 734, and/or memory of the processor(s) 710) and/or the storage unit 736 may store one or more sets of instructions and data structures (e.g., software) embodying or utilized by any one or more of the methodologies or functions described herein. These instructions, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to processors 710. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A vehicle computing system configured to control a vehicle, the vehicle computing system comprising:
   one or more processors of a machine; and
   a machine-storage medium storing instructions that, when executed by the one or more processors, cause the machine to perform operations comprising:
      collecting a data set comprising a first plurality of raw intensity values output by a first channel from among a plurality of channels of a light detection and ranging (Lidar) unit, each channel being capable of operating at a plurality of power levels, the plurality of raw intensity values being output by the first channel at a first power level from among the plurality of power levels;
      computing a first calibration multiplier and a first bias value for the first power level of the first channel using a linear model, the linear model describing an expected intensity value as a function of a raw intensity variable, a calibration multiplier variable, and a bias variable;
      assigning the first calibration multiplier and the first bias value to the first power level of the first channel;
      during operation of the vehicle, determining calibrated intensity values based on application of the linear model to subsequent raw intensity values output by the first channel at the first power level using the first calibration multiplier and the first bias value assigned to the first power level of the first channel; and
      determining a motion plan for the vehicle based on the calibrated intensity values, the motion plan controlling motion of the vehicle.

2. The vehicle computing system of claim 1, wherein:
the data set further comprises a second plurality of raw intensity values output by the first channel at a second power level from among the plurality of power levels; and
the operations further comprise:
computing, using the linear model, a second calibration multiplier and a second bias value corresponding to the second power level of the first channel;
assigning the second calibration multiplier and the second bias value to the second power level of the first channel; and
determining further calibrated intensity values based on application of the linear model to subsequent raw intensity values output by the first channel at the second power level using the second calibration multiplier and the second bias value assigned to the second power level of the first channel.

3. The vehicle computing system of claim 1, wherein:
the data set further comprises a second plurality of raw intensity values output by a second channel at the first power level from among the plurality of power levels; and
the operations further comprise:
computing, using the linear model, a second calibration multiplier and a second bias value corresponding to the first power level of the second channel;
assigning the second calibration multiplier and the second bias value to the first power level of the second channel; and
determining further calibrated intensity values based on application of the linear model to subsequent raw intensity values output by the second channel at the first power level using the second calibration multiplier and the second bias value assigned to the first power level of the second channel.

4. The vehicle computing system of claim 1, wherein the computing of the first calibration multiplier and the first bias value comprises:
solving, through optimization, the linear model using a ground truth reflectance value as the expected intensity value.

5. The vehicle computing system of claim 4, wherein the collecting of the data set comprises accumulating, from each channel and at each power level, multiple data points corresponding to each target.

6. The vehicle computing system of claim 5, wherein the accumulating of the multiple data points corresponding to each target includes accumulating data points output by each channel at multiple different distances from each target.

7. The vehicle computing system of claim 6, wherein the accumulating of the data points output by each channel at multiple different distances from each target includes accumulating data points output by each channel at multiple different angles relative to each target.

8. The vehicle computing system of claim 1, wherein the determining of the calibrated intensity values comprises solving the linear model for the expected intensity value using:
a raw intensity value from the subsequent raw intensity values for the raw intensity variable;
the first calibration multiplier for the calibration multiplier variable; and
the first bias value for a bias variable.

9. The vehicle computing system of claim 1, wherein the data set comprises point data output by each channel of the plurality of channels of the Lidar unit at each power level of the plurality of power levels, the point data comprising a plurality of data points corresponding to a plurality of targets.

10. A method comprising:
collecting a data set comprising a first plurality of raw intensity values output by a first channel from among a plurality of channels of a light detection and ranging (Lidar) unit, each channel being capable of operating at a plurality of power levels, the plurality of raw intensity values being output by the first channel at a first power level from among the plurality of power levels;
computing a first calibration multiplier and a first bias value for the first power level of the first channel using a linear model, the linear model describing an expected intensity value as a function of a raw intensity variable, a calibration multiplier variable, and a bias variable;
assigning the first calibration multiplier and the first bias value to the first power level of the first channel;
determining, using one or more processors, calibrated intensity values based on application of the linear model to subsequent raw intensity values output by the first channel at the first output level using the first calibration multiplier and the first bias value assigned to the first power level of the first channel, the subsequent raw intensity values being output by the first channel at the first output level during operation of a vehicle system that includes the Lidar unit; and
determining a motion plan for the vehicle system based on the calibrated intensity values, the motion plan controlling motion of the vehicle system.

11. The method of claim 10, wherein:
the data set further comprises a second plurality of raw intensity values output by the first channel at a second power level from among the plurality of power levels; and
the method further comprises:
computing, using the linear model, a second calibration multiplier and a second bias value corresponding to the second power level of the first channel;
assigning the second calibration multiplier and the second bias value to the second power level of the first channel; and
determining further calibrated intensity values based on application of the linear model to subsequent raw intensity values output by the first channel at the second power level using the second calibration multiplier and the second bias value assigned to the second power level of the first channel.

12. The method of claim 10, further comprising:
the data set further comprises a second plurality of raw intensity values output by a second channel at the first power level from among the plurality of power levels;
the method further comprises:
computing, using the linear model, a second calibration multiplier and a second bias value corresponding to the first power level of the second channel;
assigning the second calibration multiplier and the second bias value to the first power level of the second channel;
determining further calibrated intensity values based on application of the linear model to subsequent raw intensity values output by the second channel at the first power level using the second calibration multiplier and the second bias value assigned to the first power level of the second channel.

13. The method of claim 10, wherein the computing of the first calibration multiplier and the first bias value comprises:
   solving, through optimization, the linear model using a ground truth intensity value as the expected intensity value.

14. The method of claim 13, wherein the determining of the calibrated intensity values comprises solving the linear model for the expected intensity value using:
   a raw intensity value from the subsequent raw intensity values for the raw intensity variable;
   the first calibration multiplier for the calibration multiplier variable; and
   the first bias value for a bias variable.

15. The method of claim 10, wherein the collecting of the data set comprises collecting point data output by each channel of the plurality of channels of the Lidar unit at each power level of the plurality of power levels, the point data comprising a plurality of data points corresponding to a plurality of targets.

16. The method of claim 15, wherein the collecting of the point data comprises obtaining, from each channel and at each power level, multiple data points corresponding to each target, the multiple data points corresponding to each target including data points output at multiple distances from each target, the data points output at multiple distances from each target including data points output at multiple angles at each distance.

17. The method of claim 15, wherein:
   the Lidar unit is mounted to a vehicle; and
   the collecting point data output by each channel of the plurality of channels of the Lidar unit at each power level of the plurality of power levels comprises:
      arranging the plurality of targets on a track;
      positioning the vehicle at multiple measurement locations along the track, each measurement location being at a different distance from the plurality of targets; and
      at each measurement location, accumulating data points output by each channel at each power level while orienting the vehicle at multiple angles.

18. The method of claim 17, further comprising using one or more ramps, at each measurement location, to orient the vehicle at multiple angles.

19. The method of claim 15, wherein:
   the Lidar unit is mounted to a gimbal during the collecting of the multiple data points; and
   the collecting point data output by each channel of the plurality of channels of the Lidar unit at each power level of the plurality of power levels comprises:
      arranging a plurality of targets, each target being positioned at one of the multiple distances from the Lidar unit; and
      accumulating data points output by each channel at each power level while rotating the Lidar unit at multiple angles using the gimbal.

20. A non-transitory machine-storage medium storing a set of instructions that, when executed by one or more processors, cause a machine to perform operations comprising:
   collecting a data set comprising a first plurality of raw intensity values output by a first channel from among a plurality of channels of a light detection and ranging (Lidar) unit, each channel being capable of operating at a plurality of power levels, the first plurality of raw intensity values being output by the first channel at a first power level from among the plurality of power levels;
   computing a first calibration multiplier and a first bias value for the first power level of the first channel using a linear model, the linear model describing an expected intensity value as a function of a raw intensity variable, a calibration multiplier variable, and a bias variable;
   assigning the first calibration multiplier and the first bias value to the first power level of the first channel;
   during operation of a vehicle, determining calibrated intensity values based on application of the linear model to subsequent raw intensity values output by the first channel at the first power level using the first calibration multiplier and the first bias value assigned to the first power level of the first channel; and
   determining a motion plan for the vehicle based on the calibrated intensity values, the motion plan controlling motion of the vehicle.

* * * * *